United States Patent
Brok et al.

(10) Patent No.: US 10,518,763 B2
(45) Date of Patent: Dec. 31, 2019

(54) BRAKE SYSTEM FOR A MOTOR VEHICLE AS WELL AS METHOD OF OPERATING A BRAKE SYSTEM FOR A MOTOR VEHICLE

(71) Applicant: AUDI AG, Ingolstadt (DE)

(72) Inventors: Tobias Brok, Kösching (DE); Herbert Ernst, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 33 days.

(21) Appl. No.: 15/921,963

(22) Filed: Mar. 15, 2018

(65) Prior Publication Data

US 2018/0290641 A1 Oct. 11, 2018

(30) Foreign Application Priority Data

Apr. 11, 2017 (DE) .................. 10 2017 206 250

(51) Int. Cl.
*B60T 15/02* (2006.01)
*B60T 8/26* (2006.01)
(Continued)

(52) U.S. Cl.
CPC ............ *B60T 15/028* (2013.01); *B60T 8/267* (2013.01); *B60T 8/348* (2013.01); *B60T 8/404* (2013.01);
(Continued)

(58) Field of Classification Search
CPC .... B60T 8/4081; B60T 8/4072; B60T 13/662; B60T 8/326; B60T 13/141; B60T 15/36; B60T 8/268; B60T 15/028; B60T 8/267; B60T 8/348; B60T 8/404; B60T 13/588; B60T 8/306; B60T 17/083; F15B 2201/31
See application file for complete search history.

(56) References Cited

U.S. PATENT DOCUMENTS 5,211,454 A * 5/1993 Schaefer ................. B60T 8/348
180/197
5,568,962 A * 10/1996 Enomoto ................. B60L 7/26
303/3
(Continued)

FOREIGN PATENT DOCUMENTS

DE 19616538 A1 11/1997
DE 10259489 A1 7/2004
(Continued)

OTHER PUBLICATIONS

English translation of DE102016201261A1, Jul. 28, 2016.*
(Continued)

*Primary Examiner* — Bradley T King
*Assistant Examiner* — Mahbubur Rashid
(74) *Attorney, Agent, or Firm* — Maier & Maier, PLLC

(57) ABSTRACT

A brake system for a motor vehicle has at least a first wheel brake and at least a second wheel brake. A first inlet valve is fluidically connected, on the one hand, to the first wheel brake, and, on the other hand, to a brake pressure source, and a second inlet valve is fluidically connected, on the one hand, to the second wheel brake, and, on the other hand, to the brake pressure source. In this case, a switching valve is provided, which fluidically connects the one fluid outlet of the second inlet valve in a first switching position to the second wheel brake and in a second switching position to the first wheel brake.

9 Claims, 1 Drawing Sheet

(51) Int. Cl.
*B60T 8/34* (2006.01)
*B60T 8/40* (2006.01)
*B60T 13/58* (2006.01)
*B60T 13/66* (2006.01)
B60T 8/30 (2006.01)
B60T 17/08 (2006.01)

(52) U.S. Cl.
CPC .......... *B60T 8/4072* (2013.01); *B60T 8/4081* (2013.01); *B60T 13/588* (2013.01); *B60T 13/662* (2013.01); B60T 8/306 (2013.01); B60T 17/083 (2013.01); F15B 2201/31 (2013.01)

(56) References Cited

U.S. PATENT DOCUMENTS

| | | | | |
|---|---|---|---|---|
| 5,810,456 | A * | 9/1998 | Inagaki | B60T 8/267 303/116.1 |
| 5,997,106 | A * | 12/1999 | Takayama | B60T 7/042 303/10 |
| 6,074,019 | A * | 6/2000 | Phillips | B60T 7/042 303/113.5 |
| 6,079,793 | A * | 6/2000 | Takayama | B60T 7/042 303/116.1 |
| 6,293,633 | B1 * | 9/2001 | Hara | B60T 8/17616 303/113.2 |
| 6,354,672 | B1 * | 3/2002 | Nakamura | B60T 8/367 188/358 |
| 6,588,855 | B2 * | 7/2003 | Harris | B60T 7/042 303/15 |
| 6,595,598 | B2 * | 7/2003 | Harris | B60T 8/4072 303/11 |
| 6,598,943 | B2 * | 7/2003 | Harris | B60T 7/042 303/113.4 |
| 8,733,849 | B2 * | 5/2014 | Tanaka | B60T 8/3655 303/116.2 |
| 2005/0029864 | A1 * | 2/2005 | Bauer | B60T 7/12 303/191 |
| 2006/0066146 | A1 * | 3/2006 | Otomo | B60T 8/26 303/151 |
| 2006/0202551 | A1 * | 9/2006 | Gottwick | B60T 8/4081 303/116.1 |

FOREIGN PATENT DOCUMENTS

| | | |
|---|---|---|
| DE | 10319338 A1 | 11/2004 |
| DE | 102004001563 A1 | 8/2005 |
| DE | 10 2011 108 297 A1 | 8/2012 |
| DE | 102011110892 A1 | 2/2013 |
| DE | 102012201820 A1 | 8/2013 |
| DE | 112013006733 T5 | 11/2015 |
| DE | 102016201261 A1 | 7/2016 |
| DE | 102016212772 A1 | 1/2017 |
| DE | 10 2016 215 892 A1 | 3/2017 |
| JP | 09290724 A * 11/1997 | .............. B60T 8/346 |
| WO | 97/38886 A1 | 10/1997 |
| WO | 97/41016 A1 | 11/1997 |
| WO | 00/68053 A1 | 11/2000 |

OTHER PUBLICATIONS

European Search Report dated Aug. 17, 2018, in connection with corresponding EP Application No. 18159111.6 (9 pgs.).

Search Report dated Jan. 17, 2018 of corresponding German application No. 102017206250.9; 10 pgs.

\* cited by examiner

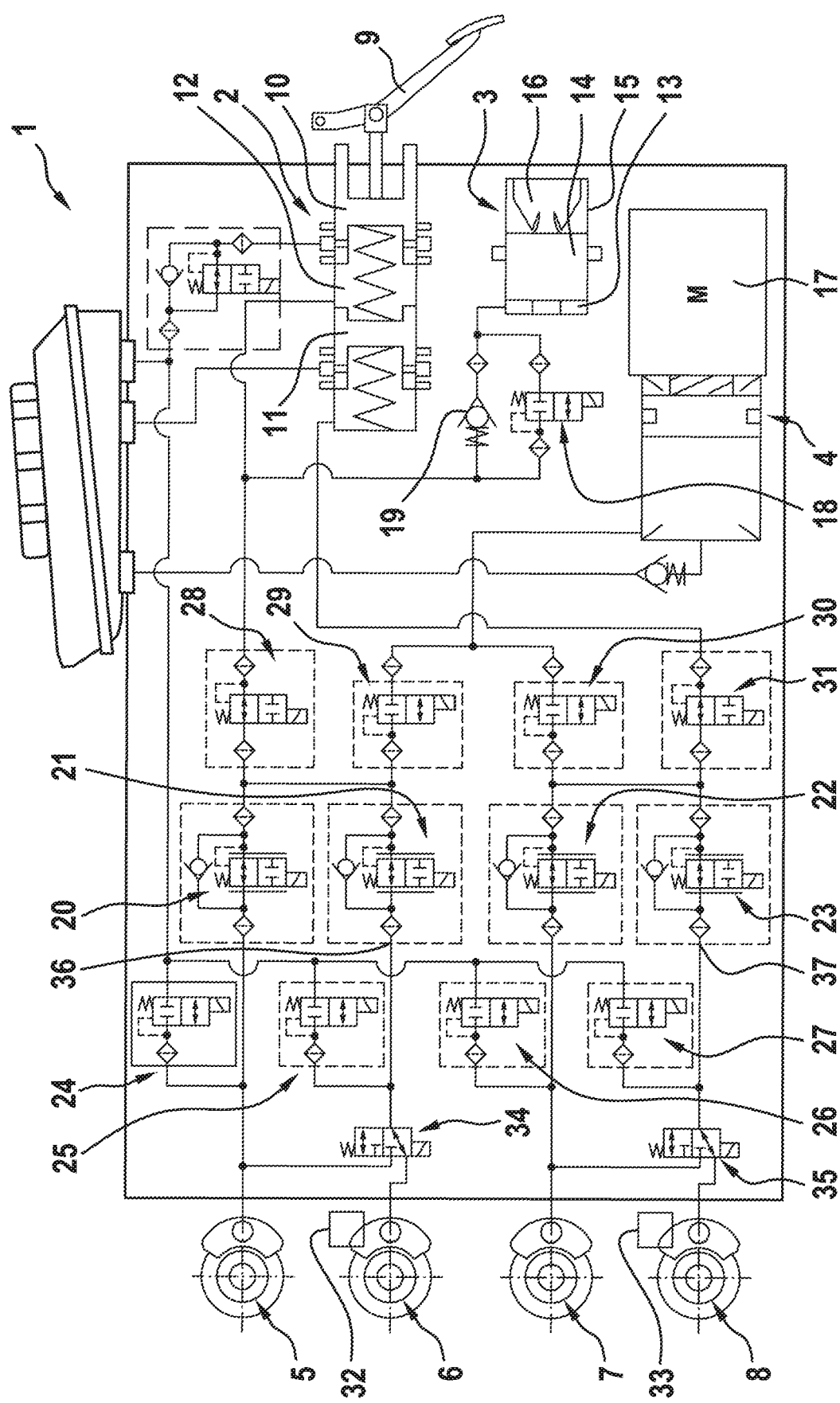

BRAKE SYSTEM FOR A MOTOR VEHICLE AS WELL AS METHOD OF OPERATING A BRAKE SYSTEM FOR A MOTOR VEHICLE

FIELD

The invention relates to a brake system for a motor vehicle, comprising at least a first wheel brake and at least a second wheel brake, wherein a first inlet valve is fluidically connected, on the one hand, to the first wheel brake and, on the other hand, to a brake pressure source, and a second inlet valve is fluidically connected, on the one hand, to the second wheel brake and, on the other hand, to the brake pressure source. The invention furthermore relates to a method for operating a brake system for a motor vehicle.

BACKGROUND

The brake system serves to slow down the motor vehicle, i.e., to provide a braking force acting on wheels of the motor vehicle. The braking force is applied to the wheels with the aid of the wheel brakes, i.e., the first wheel brake and the second wheel brake. In this case, the first wheel brake is provided for applying the braking force to a first of the wheels and the second wheel brake is provided for applying the braking force to a second of the wheels. If the motor vehicle has more than two wheels, then the brake system preferably has an additional wheel brake for at least one of the other wheels or all of the other wheels, by means of which the braking force may also be applied to the at least one additional wheel. For example, an actual brake pressure is applied to the wheel brakes upon actuating an operating element. The brake system is accordingly present as a service brake of the motor vehicle or forms at least a component of the service brake.

The brake system, for example, has a main brake cylinder, in which a main brake piston is movably arranged. Together with the main brake cylinder, the main brake piston bounds a brake fluid volume, which is variable, its size being dependent on the position of the main brake piston. The main brake piston is coupled to an operating element, which is present as a brake pedal, for example. By way of the operating element, a driver of the motor vehicle can adjust a desired braking force, which is called hereafter the specified braking force and which preferably stands in a fixed relation with a specified brake pressure.

The brake system is preferably present as an electrohydraulic brake system. This means that, in at least one operating mode of the brake system, upon actuating the operating element, the brake fluid present in the brake fluid volume does not directly provide the actual brake pressure—or at least a portion of this—applied to the first wheel brake and/or second wheel brake. Instead, it is provided that, upon actuating the operating element, a target brake pressure is to be determined, which can be provided with the aid of at least one sensor, which is coordinated with the operating element and/or the main brake piston and/or the main brake cylinder and/or a simulator cylinder, in which a simulator piston is movably arranged.

The sensor may be designed, for example, as a distance sensor or as a pressure sensor. In the first case, the sensor is used to determine the actuation path of the operating element by which the operating element has moved when actuated. In addition or alternatively, of course, the pressure present in the main brake cylinder can be determined by means of the sensor. From the quantities measured with the aid of the sensor, i.e., the distance and/or the pressure, for example, the target brake pressure is then determined. After this, an actual brake pressure corresponding to the target brake pressure is adjusted or applied to the first wheel brake and/or the second wheel brake.

The actual brake pressure is thereby provided by the brake pressure source, which is present, for example, in the form of a pump, especially an electrically operated pump. In the above-described operating mode of the brake system, accordingly, the brake fluid volume is not connected or at least not directly connected or fluidically connected, to the first wheel brake and/or the second wheel brake. Still, in order to provide the driver of the motor vehicle with a haptic feedback upon actuation of the operating element, the main brake cylinder is preferably coordinated with an—optional—braking force simulator. The latter has a simulator piston, which is movably arranged in a simulator cylinder and braced by a spring element against a wall of the simulator cylinder, and being thus spring-loaded.

The simulator piston, together with the simulator cylinder, bounds a simulator fluid volume, which is variable, analogously to the brake fluid volume, the size of the simulator fluid volume being dependent on the position of the simulator piston. The simulator fluid volume is fluidically connected to the brake fluid volume. Upon actuating the operating element, the brake fluid volume is decreased and brake fluid present in the brake fluid volume is supplied to the simulator fluid volume. Accordingly, the simulator fluid volume increases, which deflects the simulator piston against the spring force.

Depending on the spring force, which may depend on the deflection of the simulator piston, in the described operating mode, an opposing force acts on the operating element because of the fluidic connection between the simulator fluid volume and the brake fluid volume, and this is directed opposite to the operating force applied by the driver of the motor vehicle to the operating element. Accordingly, the driver receives by way of the operating element a haptic feedback, which is basically dependent on the deflection of the operating element from its starting position or position of rest.

In order to provide a fallback in event of a fault in the brake system, such as, for example, a loss of the brake pressure source, there is preferably a direct fluidic connection between the main brake cylinder and the first wheel brake and/or the second wheel brake. In this way, even given a defect in the brake system, an actual brake pressure can be built up on the first wheel brake and/or the second wheel brake upon actuating the operating element. But for this purpose, the driver must apply a substantially greater operating force to the operating element than is usual.

SUMMARY

The object of the invention is to propose a method for operating a brake system for a motor vehicle, which has benefits when compared with known methods; in particular, it also enables a safe operation of the brake system in the event of a fault, especially a "fail operational" behavior.

This is accomplished according to the invention. In this case, a switching valve is provided which fluidically connects a fluid outlet of the second inlet valve in a first switching position to the second wheel brake, and in a second switching position to the first wheel brake.

The switching valve is accordingly fluidically arranged between the second inlet valve, on the one hand, and both the first wheel brake and the second wheel brake, on the other hand. Preferably, the first wheel brake is permanently fluidically connected to a fluid outlet of the first inlet valve, whereas the fluidic connection between the fluid outlet of the second inlet valve and the first wheel brake only exists in the second switching position, but not in the first switching position of the switching valve.

By arranging the switching valve in the second switching position, it is possible to actuate the first wheel brake by means of the second inlet valve and—optionally—by means of a second outlet valve. In the event of a defect in the first inlet valve and/or a first outlet valve, the actuating of the first wheel brake may accordingly be undertaken entirely by means of the second inlet valve and/or the second outlet valve. This is especially meaningful if the first wheel brake is associated with a front wheel of the motor vehicle and the second wheel brake is associated with a rear wheel of the motor vehicle. On the one hand, it is meaningful in this case to apply a larger braking force or a larger braking torque to the front wheel than to the rear wheel during a braking process of the motor vehicle. Furthermore, a parking brake is usually provided at the rear wheel, by means of which a braking force or a braking torque can be applied to the rear wheel, even when the second wheel brake is decoupled from the brake pressure source.

It may be provided that, in the first switching position of the switching valve, the first wheel brake is connected to the fluid outlet of the first inlet valve and decoupled from the fluid outlet of the second inlet valve. On the contrary, in the first switching position of the switching valve, the second wheel brake is fluidically connected to the fluid outlet of the second inlet valve and decoupled from the fluid outlet of the first inlet valve. In the second switching position, it may now be provided that the fluid outlet of the second inlet valve is in fluidic connection to both the first wheel brake and the second wheel brake. More preferably, however, the fluid outlet of the second inlet valve in the second switching position is decoupled from the second wheel brake and fluidically connected to the first wheel brake.

Furthermore, it may be provided that the first wheel brake, in the first switching position of the switching valve, is fluidically connected to the fluid outlet of the first inlet valve, and in the second switching position, it is fluidically decoupled from it. However, it may also be provided that the first wheel brake is also fluidically connected to the fluid outlet of the first inlet valve in the second switching position of the switching valve.

In the context of another embodiment of the invention, it may be provided that in the first switching position, the fluid outlet of the second inlet valve is fluidically separated from the first wheel brake. This was already mentioned above. In the first switching position, accordingly, the fluid outlet of the second inlet valve is connected only to the second wheel brake, but not to the first wheel brake. This means that in the first switching position, the fluid outlet of the first inlet valve is likewise fluidically decoupled from the fluid outlet of the second inlet valve.

An enhancement of the invention proposes that, in the second switching position, the fluid outlet of the second inlet valve is fluidically separated from the second wheel brake. This also was already mentioned above. While it may, of course, be provided that, in the second switching position as well, the fluid outlet of the second inlet valve is fluidically connected to the second wheel brake, so that the fluid outlet of the second inlet valve in the second switching position is thus connected to both the first wheel brake and to the second wheel brake; preferably, only one of the wheel brakes is actuatable by means of the second inlet valve, namely, the first wheel brake. In this way, a better controllability of the braking force or the braking torques is achieved.

Another preferred embodiment of the invention provides that the first wheel brake is permanently fluidically connected to a fluid outlet of the first inlet valve. The fluidic connection between the first wheel brake and the fluid outlet of the first inlet valve accordingly exists regardless of the switching position of the switching valve and accordingly, both in the first switching position, and in the second switching position. More preferable, however, is an embodiment in which the first wheel brake is fluidically decoupled from the fluid outlet of the first inlet valve in the second switching position of the switching valve.

Another preferred embodiment of the invention provides that the switching valve is designed as a 3/2-way valve and comprises a fluid inlet connected to the fluid outlet of the second inlet valve, a first fluid outlet connected to the first wheel brake and a second fluid outlet connected to the second wheel brake. The switching valve accordingly comprises the one fluid inlet as well as two fluid outlets, namely, the first fluid outlet and the second fluid outlet. In keeping with its design as a 3/2-way valve, two switching positions are possible, namely, the first switching position and the second switching position. In the first switching position, the fluid inlet is fluidically connected to the second fluid outlet and fluidically decoupled from the first fluid outlet. In the second switching position, on the other hand, the fluid inlet is fluidically connected to the first fluid outlet and fluidically decoupled from the second fluid outlet.

Finally, in the context of another preferred embodiment of the invention, it may be provided that the second wheel brake comprises an integrated parking brake. By integrated parking brake is meant a parking brake which engages with the same brake shoe as the hydraulic mechanism of the parking brake.

Furthermore, it may be provided that a first control circuit and a second control circuit that can be operated independently of the first control circuit, is provided, the first control circuit being connected to the first inlet valve and/or the first outlet valve, and the second control circuit being connected to the second inlet valve and/or the second outlet valve.

The two control circuits, i.e., the first control circuit and the second control circuit, can basically be operated separately from each other, i.e., they are built entirely independent of each other. Preferably, the two control circuits are supplied with electric power separately from each other, so that, accordingly, a separate power supply of the two control circuits is realized. In this case, it may be more preferably provided that the two control circuits are connected to different circuits of an onboard power network of the motor vehicle, so that even in the event of an outage of one of the power supply circuits that disables one of the control circuits, the other one is still functional.

The two control circuits may be associated basically with the same control unit and accordingly be present in a common control instrument housing. Alternatively, of course, it is possible to associate the two control circuits with separate control instruments and accordingly arrange them in different control instrument housings and therefore keep them physically separated. In the latter case, an especially good failure safety of the brake system is achieved based on the extensive separation of the control circuits.

The control circuits are connected to different valves of the two wheel brakes, i.e., the at least one first wheel brake and the at least one second wheel brake. Thus, it is provided, first of all, that the first control circuit is connected to the first inlet valve and/or the first outlet valve, and accordingly serves for the operation of the first inlet valve and/or the first outlet valve. The second control circuit, on the other hand, is connected to the second inlet valve and/or the second outlet valve, and accordingly serves for the operation of the second inlet valve and/or the second outlet valve.

Thanks to the dividing of the inlet valves and the outlet valves between the control circuits, a high redundancy is achieved, so that even in the event of the loss of one of the control circuits, the functionality of the brake system is still preserved to a large degree. Thus, in particular, a braking force distribution between the first wheel brake and the second wheel brake is still possible, namely, as long as the second wheel brake is associated with the parking brake.

It is preferably provided that the valves connected to one of the control circuits are fluidically separated from the respective other control circuits. In other words, each of the valves is actuatable solely by means of one of the control circuits, i.e., not with the other one. This separating of the valves of one of the control circuits each time makes possible the reliable continued operation even in the event of a defect in one of the control circuits, which might have resulted in a disturbed actuation of the valves by the other respective (functioning) control circuit. Thus, it should be prevented that the actuation of the valves by means of one of the control circuits is adversely affected by another of the control circuits.

The invention furthermore relates to a method for operating a brake system for a motor vehicle, especially a brake system according to the preceding embodiments, wherein the brake system comprises at least a first wheel brake and at least a second wheel brake, wherein a first inlet valve is fluidically connected, on the one hand, to the first wheel brake, and, on the other hand, to a brake pressure source, and a second inlet valve is fluidically connected, on the one hand, to the second wheel brake, and, on the other hand, to the brake pressure source. It is provided here that a switching valve fluidically connects a fluid outlet of the second inlet valve in a first switching position to the second wheel brake, and in a second switching position to the first wheel brake.

The benefits of such an embodiment of the brake system or such a procedure have already been mentioned. Both the brake system and the method for its operation can be modified according to the above remarks, so that in this regard reference is made thereto.

Another preferred embodiment of the invention provides that the switching valve is switched from the first switching position to the second switching position upon a defect in a valve mechanism. The valve mechanism in particular is a valve mechanism of the first wheel brake, wherein the valve mechanism preferably comprises at least the first inlet valve and/or the first outlet valve. As soon as the defect occurs in one of these valves or both valves, the first wheel brake can no longer be fully actuated. Accordingly, it is advisable to undertake the actuation of the first wheel brake thereafter with the aid of the second inlet valve and/or the second outlet valve. Of course, it may also be provided to carry out the actuation of the first wheel brake in the second switching position by means of the first inlet valve and either the first outlet valve or the second outlet valve, or alternatively both outlet valves.

Another embodiment of the invention provides that when the switching valve is in the second switching position, a brake pressure applied to the first wheel brake is generated by means of a brake pressure source. The brake pressure source is—as already explained above—designed, for example, as a pump, preferably as an electrically operated or driven pump. More preferably, it is provided that the brake pressure applied to the first wheel brake in both the first switching position and in the second switching position is generated by means of the brake pressure source.

Finally, in the context of another preferred embodiment of the invention it may be provided that when the switching valve is in the second switching position, a braking torque produced by the second wheel brake is generated by means of a parking brake integrated in the second wheel brake. As long as the switching valve is in the second switching position, preferably the second wheel brake is decoupled from the brake pressure source, so that no brake pressure can be built up on the second wheel brake in this way. Accordingly, it is necessary to provide the braking torque or the braking force in another way. For this purpose, the parking brake is utilized, by means of which the second wheel brake can be actuated to generate the braking torque.

BRIEF DESCRIPTION OF THE DRAWING

The invention shall now be explained more closely with the aid of the exemplary embodiments represented in the drawing, without limiting the invention thereby.

The single drawing shows:

FIG. 1 shows a schematic representation of a brake system for a motor vehicle.

DETAILED DESCRIPTION OF THE DRAWING

FIG. 1 shows a schematic representation of a brake system 1 for a motor vehicle, comprising a main brake cylinder 2, a braking force simulator 3, a brake pressure source 4, and wheel brakes 5, 6, 7 and 8. Of course, there can be any desired number of wheel brakes. In the exemplary embodiment represented here, four wheel brakes 5, 6, 7 and 8 are provided. However, there may also be a greater or lesser number of wheel brakes. In the exemplary embodiment represented, the wheel brakes 5 and 7 are associated with wheels of a first wheel axle, especially a front axle, and the wheel brakes 6 and 8 are associated with wheels of a second wheel axle, especially a rear axle of the motor vehicles.

The main brake cylinder 2 is associated with an operating element 9, which is designed here as a brake pedal. The operating element 9 is coupled to a main brake piston 10, for example, via a lever connection. The main brake piston 10 is arranged movable in the main brake cylinder 2. In the exemplary embodiment represented here, in addition to the main brake piston 10 there is arranged an additional brake piston 11 in the main brake cylinder 2. However, this piston is optional.

The main brake piston 10 together with the main brake cylinder 2 bounds a brake fluid volume 12. This is fluidically connected to a simulator fluid volume 13 of the braking force simulator 3. The simulator fluid volume 13 is bounded by a simulator piston 14 together with a simulator cylinder 15, in which the simulator piston 14 is movably arranged. The simulator piston 14 is preferably spring-loaded by means of at least one spring element 16. The spring element 16 produces a spring force on the simulator piston 14, which is directed counter to an increasing of the simulator fluid volume 13.

The main brake cylinder 2 and/or the operating element 9 is/are associated with a sensor, not shown here, by means of which a target brake pressure is determined upon an actuation of the operating element 9. After this, an actual brake pressure is applied to the at least one wheel brake 5, 6, 7 and 8 by means of the brake pressure source 4, corresponding to the target brake pressure. The brake pressure source 4 is designed here preferably as a pump, which is driven or can be driven by means of an electric motor 17.

Fluidically arranged between the brake fluid volume 12 and the simulator fluid volume 13 is a switching valve 18. Fluidically arranged in parallel with the switching valve 18 is a check valve 19. The check valve is designed so that it opens in the direction of the wheel brake 5, 6, 7 or 8, i.e., it allows a flow from the simulator fluid volume 13, but prevents a flow into the simulator fluid volume 13.

The wheel brakes 5, 6, 7 and 8 are associated with inlet valves 20, 21, 22 and 23. Outlet valves 24, 25, 26 and 27 are also present. The wheel brakes 5 and 7 are designated hereafter as first wheel brakes 5 and 7, and analogously to this the inlet valves 20 and 22 are present as first inlet valves and the outlet valves 24 and 26 as first outlet valves. The wheel brakes 6 and 8 are designed as second wheel brakes. Accordingly, the inlet valves 21 and 23 are designated the second inlet valves and the outlet valves 25 and 27 are designated the second outlet valves. In the following, only the first wheel brake 5 and the second wheel brake 6 as well as the corresponding valves shall be discussed in detail. But the statements can be applied analogously to the wheel brakes 7 and 8.

The wheel brakes 5 and 6 are connected by way of an isolation valve 28 to the main brake cylinder 2 and by way of another isolation valve 29 to the brake pressure source 4. Instead of the two isolation valves 28 and 29, however, there may also be present only a single isolation valve or more than two isolation valves. It is only important that the wheel brakes 5 and 6 be connected by way of the isolation valve 28 and/or the isolation valve 29 to the brake pressure source 4 or the main brake cylinder 2. Only for sake of completeness should it be pointed out that the wheel brakes 7 and 8 are associated with an isolation valve 30 as well as an additional isolation valve 31. The wheel brakes 7 and 8 are fluidically connected by way of the isolation valve 30 to the brake pressure source 4 and by way of the additional isolation valve 31 to the main brake cylinder 2.

Now, the wheel brakes 6 and 8 are associated with parking brakes 32 and 33. It will be noticed that the wheel brakes 5 and 6, on the one hand, as well as the wheel brakes 7 and 8, on the other hand, are each associated with a switching valve 34 or 35. The switching valves 34 and 35 connect a fluid outlet 36 or 37 in a first switching position to the second wheel brake 6 or 8 and in a second switching position to the first wheel brake 5 or 7, respectively. With such a design of the brake system 1, in the event of failure of the inlet valve 20 and/or the outlet valve 24, the wheel brake 5 can be actuated by means of the inlet valve 21 and/or the outlet valve 25.

This means that the wheel brake 5 can still be subjected to brake pressure by means of the brake pressure source 4 or brake pressure provided by it. The providing of a braking force or a braking torque to the wheel brake 6 is furthermore possible by means of the parking brake 32. The behavior is similar for the wheel brakes 7 and 8, the parking brake 33 being coordinated with the latter.

The invention claimed is:

1. A brake system for a motor vehicle, comprising:
   at least a first wheel brake and at least a second wheel brake, wherein a first inlet valve is fluidically connected, on the one hand, to the first wheel brake, and, on the other hand, to a brake pressure source, and a second inlet valve is fluidically connected, on the one hand, to the second wheel brake, and, on the other hand, to the brake pressure source, wherein a switching valve, which fluidically connects the one fluid outlet of the second inlet valve in a first switching position to the second wheel brake and in a second switching position to the first wheel brake, wherein, in the second switching position, the fluid outlet of the second inlet valve is fluidically separated from the second wheel brake.

2. The brake system according to claim 1, wherein, in the first switching position, the fluid outlet of the second inlet valve is fluidically separated from the first wheel brake.

3. The brake system according to claim 1, wherein the first wheel brake is permanently fluidically connected to a fluid outlet of the first inlet valve.

4. The brake system according to claim 1, wherein the switching valve is designed as a 3/2-way valve and comprises a fluid inlet connected to the fluid outlet of the second inlet valve, a first fluid outlet connected to the first wheel brake and a second fluid outlet connected to the second wheel brake.

5. The brake system according to claim 1, wherein the second wheel brake comprises an integrated parking brake.

6. A method for operating a brake system for a motor vehicle, wherein the brake system has at least a first wheel brake and at least a second wheel brake, wherein a first inlet valve is fluidically connected, on the one hand, to the first wheel brake, and, on the other hand, to a brake pressure source, and a second inlet valve is fluidically connected, on the one hand, to the second wheel brake, and, on the other hand, to the brake pressure source, wherein a switching valve fluidically connects a fluid outlet of the second inlet valve in a first switching position to the second wheel brake and in a second switching position to the first wheel brake, wherein, in the second switching position, the fluid outlet of the second inlet valve is fluidically separated from the second wheel brake.

7. The method according to claim 6, wherein the switching valve is switched from the first switching position to the second switching position in the case of a defect of a valve mechanism.

8. The method according to claim 6, wherein when the switching valve is in the second switching position, a brake pressure applied to the first wheel brake is generated by the brake pressure source.

9. The method according to claim 6, wherein when the switching valve is in the second switching position, a braking torque produced by the second wheel brake is generated by a parking brake integrated in the second wheel brake.

* * * * *